Inventor
BURNS D. HEMPSTEAD

Patented Jan. 29, 1929.

1,700,529

UNITED STATES PATENT OFFICE.

BURNS D. HEMPSTEAD, OF CROTON, OHIO; COSETTE W. HEMPSTEAD ADMINISTRATRIX OF SAID BURNS D. HEMPSTEAD, DECEASED.

COFFEEPOT.

Application filed May 21, 1926. Serial No. 110,648.

The object of this invention is to provide a device or pot for making an infusion of coffee of the variety called French or "drip" as distinguished from "boiled".

In the present device the principal aim is to supply the hot aqueous solvent to the ground coffee in small portions at regular intervals and automatically so that the solvent shall have ample time to spread through and saturate the body of the ground coffee and dissolve thereout the principle and tincture thereof and carry it to the pot.

The invention is embodied in the example herein shown and described, the feature of novelty being finally claimed.

In the accompanying drawing—

Figure 1:
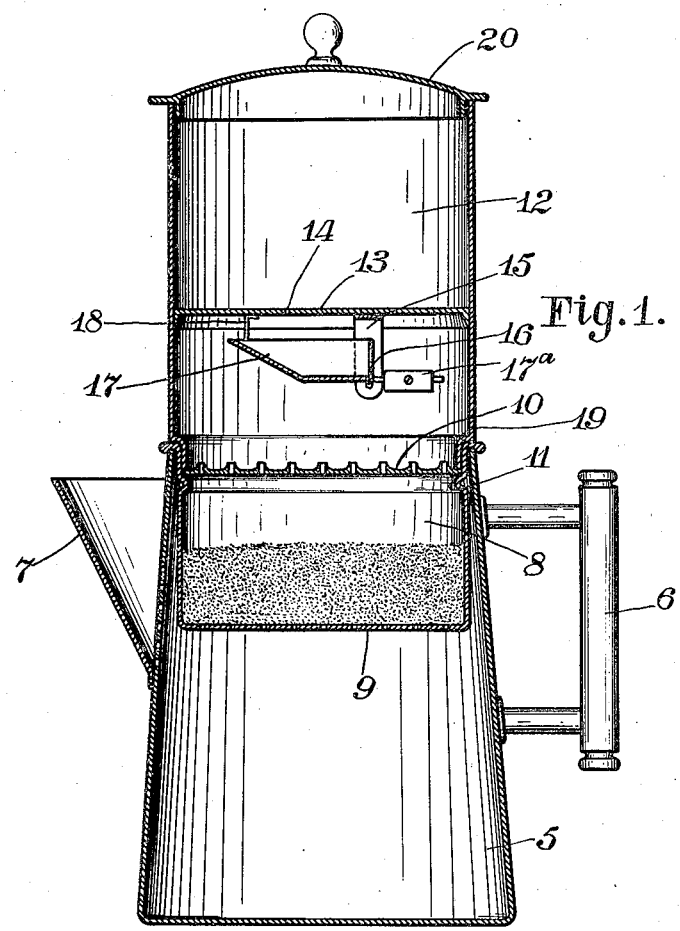
Figure 1 is a central vertical section of the apparatus according to the invention.
Figure 2:
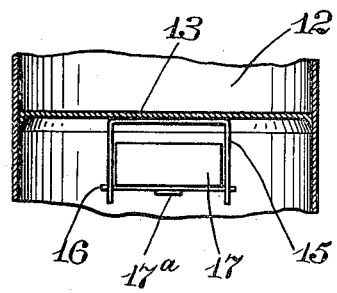
Fig. 2 is a detail to illustrate the tipple employed, this view being from the left as seen in Fig. 1.

In the views 5 designates the pot which is shown as provided with the usual handle 6 and spout 7. In the upper end of the pot is removably supported the container 8 for the ground coffee, said container having a perforated or screen bottom at 9 and a removable perforated cover or sieve 10 resting on an annular rib 11 formed in the wall of the container. The perforations of the sieve 10 are made in elevated portions thereof so that water deposited on the sieve may be compelled to rise thereon and insure a flow of water through all the holes to the ground coffee below.

12 designates the hot water reservoir, the bottom 13 of which is provided with a very small outlet or hole 14. The lower side of the bottom 13 has secured to it a bracket 15 upon which is pivoted at 16 a bucket or tipple 17 provided with slug 17ª adapted, when the bucket is empty to hold the latter upward in position to receive water flowing from the hole 14. The weight 17ª is made adjustable if desired, and said weight is only of such gravity that when the bucket has received the desired quantity of water the weight thereof plus that of the bucket at one side of the pivot overcomes that of the slug 17ª and causes the bucket to rock downward and discharge the water onto the sieve 10. A suitable stop 18 is provided to hold the bucket in horizontal position when returned to that position by the action of the weight on the emptied bucket.

The wall of the reservoir is extended downward and provided with shouldered end at 19 to fit in the upper end of the coffee container. The reservoir is provided with a suitable removable cover 20.

In making the infusion the container 8 is first supplied with the roasted and ground bean the sieve 10 being applied above and the container itself then seated in the upper end of the pot. The water reservoir is then inserted in its place in the container, and hot water is then poured in desired quantity into the reservoir and the cover thereof applied. The hot water immediately begins to charge the tipple which when sufficiently supplied tilts down to discharge the contents into the sieve. The last operation is repeated automatically until all the water of the reservoir has run out. The time required to complete the operation is dependent upon the size of the hole 14 and this hole can be made so that it will, on the average charge the bucket sufficiently to tilt it in say 15 seconds. The strength of the infusion is, of course, further regulated and determined by the quantity and quality or both of the coffee and as well as by the quantity of the water used these being proportioned as taste, judgment and economy may dictate.

While I have described my invention as principally designed for the making of an infusion of coffee it can also be used in making potable infusions of other materials, for example, tea. Both tea and coffee are often made as decoctions, but on the authority of physicians, epicures and connoisseurs this is not the wisest or best practice. With my invention the hot water in either case is caused to slowly and gradually pass through the material from which the infusion is made and in a given or regulated time. It might be mentioned that the cessation of the blows of the returning tipple against the stop 18 affords a good signal as to when the operation of the tipple is completed, after which time the reservoir and material container can be confidently removed, the lid 20 being applied to the pot preparatory to serving.

The forms of the parts can be changed without departing from the gist of the invention as claimed.

What I claim is:

A device for making a potable infusion comprising a pot, a container for the material from which the infusion is made adapted to discharge into the pot, a water reservoir above the said container, said reservoir having a free continuously discharging opening at its bottom, a tipple adapted to receive supplies of water from said opening of the reservoir and be periodically tilted thereby to automatically discharge the water to said material container, and a stop against which said tipple strikes upon each discharge of water to afford by the cessation of striking a signal indicating the final discharge of water therefrom.

BURNS D. HEMPSTEAD.